(12) United States Patent
King et al.

(10) Patent No.: US 8,381,244 B2
(45) Date of Patent: Feb. 19, 2013

(54) CONTENT INJECTION SYSTEM AND METHODOLOGY

(75) Inventors: Michael J. King, Camas, WA (US); John W. Morris, IV, Washougal, WA (US); Brian S. Bosworth, Wheeling, WV (US)

(73) Assignee: Abacast, Inc., Camas, WA (US)

( * ) Notice: Subject to any disclaimer, the term of this patent is extended or adjusted under 35 U.S.C. 154(b) by 730 days.

(21) Appl. No.: 11/985,143

(22) Filed: Nov. 13, 2007

(65) Prior Publication Data

US 2008/0120638 A1 May 22, 2008

Related U.S. Application Data

(60) Provisional application No. 60/860,573, filed on Nov. 21, 2006.

(51) Int. Cl.
*H04N 7/10* (2006.01)
*H04N 7/025* (2006.01)

(52) U.S. Cl. .............. 725/32; 725/35; 705/14.4

(58) Field of Classification Search .......... 725/32
See application file for complete search history.

(56) References Cited

U.S. PATENT DOCUMENTS

| | | | |
|---|---|---|---|
| 6,487,721 B1 * | 11/2002 | Safadi | 725/36 |
| 6,577,716 B1 * | 6/2003 | Minter et al. | 379/101.01 |
| 7,412,714 B2 * | 8/2008 | Kitayama | 725/34 |
| 7,676,405 B2 * | 3/2010 | Steelberg et al. | 705/28 |
| 2001/0023498 A1 * | 9/2001 | Cosmao et al. | 725/32 |
| 2002/0078443 A1 * | 6/2002 | Gadkari et al. | 725/32 |
| 2003/0033157 A1 * | 2/2003 | Dempski et al. | 705/1 |
| 2003/0188320 A1 * | 10/2003 | Shing | 725/131 |
| 2004/0025176 A1 * | 2/2004 | Franklin et al. | 725/22 |
| 2004/0128682 A1 * | 7/2004 | Liga et al. | 725/35 |
| 2004/0133467 A1 * | 7/2004 | Siler | 705/14 |
| 2007/0074243 A1 * | 3/2007 | Verhaegh et al. | 725/32 |

* cited by examiner

*Primary Examiner* — Robert Hance
(74) *Attorney, Agent, or Firm* — Seed IP Law Group PLLC

(57) ABSTRACT

A method, and an associated system, for sending to a first group of recipients only the content portions of a continuity source data-flow which takes the form of ordered, successive, alternating content and non-content segments. From a methodologic point of view, the invention involves, in a manner which utilizes content-segment material buffering, delivering fully, and in correct order, to the first recipient group the material in each content segment, via steps including (a) bridging each gap between next-adjacent content segments at least partially with transmitted injection material that differs from the non-content segment material in the gap, which injection material ends in time no sooner than the end of the gap, and (b) employing, as needed, and as a part of such full delivering of content-segment material, time-progressive, time-length-variable buffering, and subsequent, progressive buffer-delivering, of any content-segment material which overlaps in time with the transmission of injection material.

18 Claims, 1 Drawing Sheet

CONTENT INJECTION SYSTEM AND METHODOLOGY

CROSS REFERENCE TO RELATED APPLICATION

This application claims filing-date priority to previously filed, currently U.S. Provisional Patent Application Ser. No. 60/860,573, filed Nov. 21, 2006, for "Content Injection System and Methodology". The entire disclosure content of that provisional patent application is hereby incorporated herein by reference.

BACKGROUND AND SUMMARY OF THE INVENTION

This invention pertains to a content injection system and methodology associated with delivering, differently to different audiences, or audience groups, of a "source" data flow characterized by an alternating series of what we refer to herein as content and non-content segments. It should be understood that in the implementation and practice of the invention, different kinds of such source data may be handled, such as audio data and video data. Generally speaking we apply the term "content", as associated with such data, to refer to the principal, or central, programming material/segments contained therein, and we use the term "non-content" to refer to segments of data that lie between content segments—typically taking the form of certain kinds of advertising (ad break) material.

For the purpose of illustration herein, the invention is described in the context of a broadcast radio station which delivers a source broadcast flow of audio data/information to two different kinds of audience groups, including what will be referred to as being a "broadcast" audience, and as an on-line "streaming audience". In other language employed in this document, the on-line streaming audience is referred to as a first group of recipients, and the broadcast audience as a second group of recipients.

Using such a station audio-broadcast context for illustration purposes, as mentioned, this invention focuses attention on a practice involving periodically separating the broadcast and streaming audiences in order to account for, and deal effectively with, the presence, in the source broadcast-data flow, of certain "non-streamable content"—i.e., its non-content segments. For example, for reasons of cost, and/or because of certain controlling rules and/or regulations, etc., some kinds of advertising content which are permissibly "broadcastable" to a broadcast audience are not permissibly "streamable" to a streaming audience. Put another way, the properly broadcastable data flow contains both types of segments (i.e., content and non-content segments, as mentioned above), whereas the streamable data flow is allowed to contain only, from such a source broadcast data flow, the content-segment portions thereof.

Accordingly, and because of the fact that such non-streamable content material resides naturally within a source broadcast flow of data of the type described, something needs to be done to assure a high-quality, non-disruptive flow of information to the streaming audience which effectively "side-steps" the non-streamable (i.e., non-content) segment material. Regarding such "side-stepping" it is important that, in the context now being generally described, a streaming audience ultimately receive, in as timely a fashion as possible, and fully, the same, streamable (i.e., content-segment) broadcast material as does a broadcast audience, without receiving the non-streamable content material, and without experiencing distracting, unnatural gaps in ultimate reception of the appropriately streaming content-segment material.

The proposed "side-stepping" behavior of the present invention avoids the presence of such an unnatural distraction (a) by injecting into the otherwise gapped flow of streamable content material, selected, alternate (or alternative), permissibly streamable material (referred to variously herein as injection material, and as injection-content material) which masks the broadcast flow of non-streamable, non-content material, and (b) by using a variable-time-size, time-displacing buffer which operates, as will be fully explained below, to capture, for later, seamless streaming output to the streaming audience, all appropriately streamable content-segment material time-spans which have become "masked" because of the occurrences of duration overlaps that will naturally take place in relation to injection of the just-above-mentioned injection-content material. Such injection takes place during what we refer to herein as an injection time period. In many instances, and as will be seen, material delivered to a streaming audience during such an injection time period will begin with the delivery from the mentioned buffer of any then-buffered (i.e., previously buffered) content-segment material. Alternative injection material may typically take the forms, for example, of alternative advertising material which is suitable for delivery for the streaming audience, and music, such as songs. In general terms, here is how this unique practice of the present invention works.

When a non-streamable advertisement begins (an ad break) in the broadcast data flow, a trigger/control signal is generated by the system and practice of this invention to cause, effectively, a data-flow separation to take place between the broadcast audience and the streaming audience. With this separation place, and following the then delivery to the streaming audience (from the mentioned buffer) of any previously buffered content-segment material, alternative content, coming from what we refer to as an alternative (or injection) content repository managed by the relevant radio station, is injected into the streaming data flow to cover, along with the delivered buffered material. Alternative injection material is delivered at least for a length of time extending to when, again, streamable broadcast content resumes in the broadcast-data flow. Often, such injection-content material will extend in time in a manner producing a modest time overlap with the resumption of content-material broadcasting, and in such an "overlap" circumstance, content-segment data buffering begins in accordance with practice of the invention to deal fully with such an overlap. This injection activity seamlessly bridges, for the streaming audience, the time spaces between broadcast-flow content-material segments.

In the operational context of the preferred embodiment, and manner of practicing the methodology, of the invention, as is now being generally described, an important feature, which is believed to be unique, is that no effort is made regarding, and therefore no complexity and extra cost are involved in, exactly matching the lengths of time that ad break data is present in the source broadcast material with the lengths of time that buffered and alternative content materials are delivered during an injection time period to the streaming audience. This unique practice of the present invention is extremely advantageous, as will be recognized by those generally skilled in the relevant art.

Accordingly, and as will be more fully explained and illustrated herein, in most "injection modes", content injection lasts beyond the ends of the broadcasting of the included non-streamable ad break material. Because of this, and for at least a length of time (as suggested immediately above) which is measured between the ends of broadcasting of the non-streamable material segments and the natural ends of "current" injection material still being streamed to the streaming audience, broadcast content-segment material is buffered in order to capture the eventually-resumed, permissibly-streamable broadcast content data. Such time-measured buffering continues appropriately in a manner which will be more fully explained below.

As will be seen, the buffer which is utilized to accomplish this buffering activity is designed to have a propensity to continue to empty itself as expeditiously as possible. Experience with a practical implementation of the system and methodology of the invention has shown that the overall time span period contained at any point in time in the employed buffer exists generally within the range of 0-minutes to about 2-minutes. Longer periods of buffering are, of course, possible if desired for certain applications.

Thus, and reflecting upon the operation just generally outlined, the streaming audience, under all circumstances, normally receives all streamable broadcast content-segment material interleaved with permissibly deliverable injection material, with up to a certain modest, and variable (over time), time lag occurring related to the receipt of the same, principal broadcast content-segment material which is delivered to the broadcast audience. The streaming audience, however, will not noticeably experience/appreciate this time lag, but rather will receiving what will seem to it to be a traditional, seamless flow of streaming data. The broadcast-receiving audience will, of course, receive, intact and unaltered, the full broadcast-data flow, including both the streamable content and the non-streamable content of that flow.

These and other features and advantages which are offered by the present invention will now become more fully apparent as the detailed description of the invention, and of its methodology, are described in conjunction with the accompanying drawing figures.

DETAILED DESCRIPTION OF THE INVENTION

Figure 1:
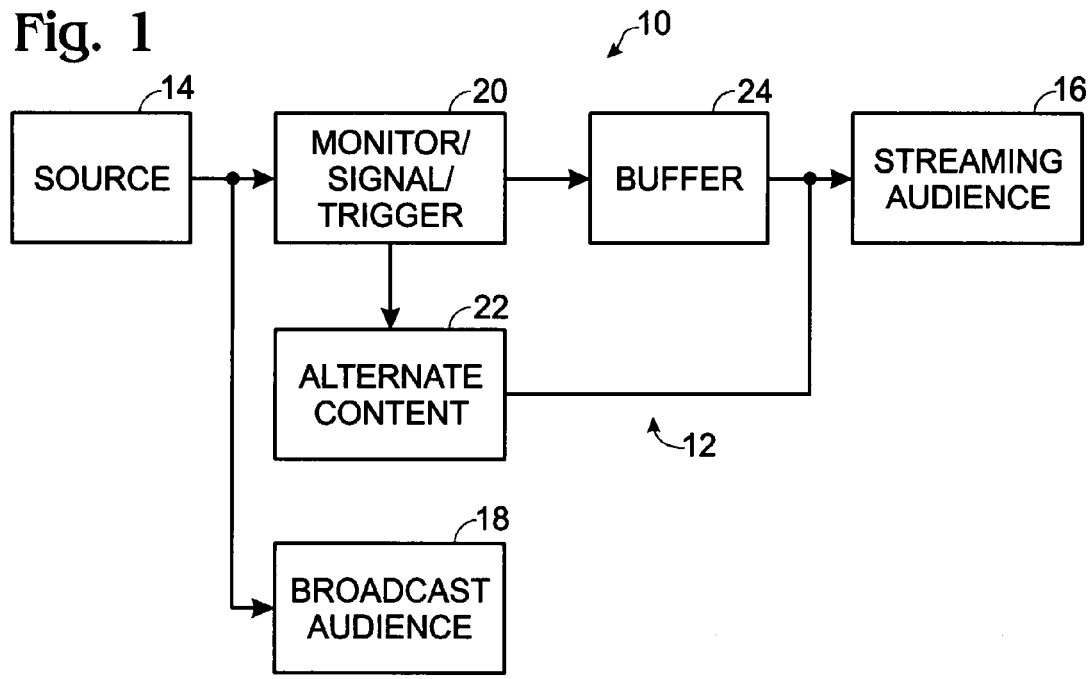
FIG. 1 is a high-level, schematic diagram generally illustrating a preferred and best mode embodiment of a system constructed to operate in accordance with the methodology of the present invention.
Figure 2:
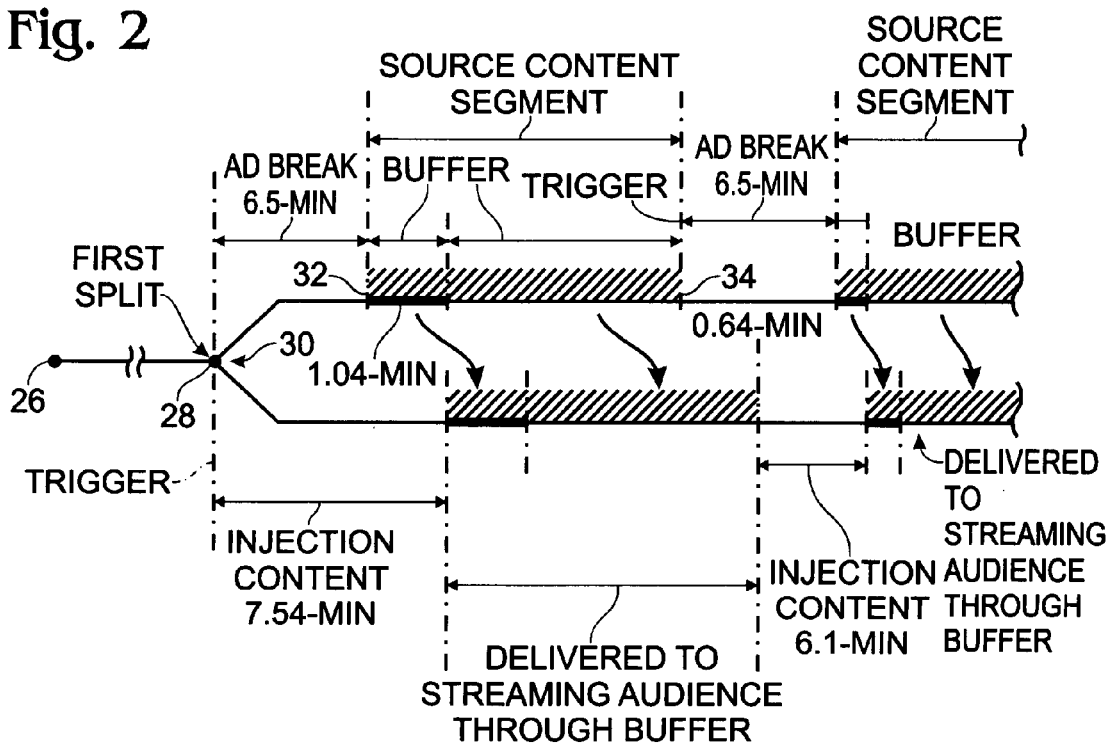
FIG. 2 is a graphical, high-level, time-flow diagram which, when read in conjunction with the systemic view of FIG. 1, fully describes the methodology of the present invention with reference to specific timing illustrations of practice of the invention.

Turning attention now to the drawings, and referring to both FIGS. 1 and 2, these two drawing figures, when read together with the following detailed description of the invention, fully explain the systemic and methodologic features of the invention. With respect to what is shown in FIG. 1, it should be understood that this high-level drawing is simply schematically representative of the key features that are included in the structure of the invention, with the further understanding that there are many detailed and conventional ways in which what is shown generally, and schematically only, in FIG. 1 may be constructed and configured for use in the practice of this invention. Such details, varied and individually conventional as they are or may be, will be completely understood by those generally skilled in the art without further elaboration. For this reason, specific structural details of what is shown in FIG. 1 are not set forth herein.

FIG. 1 illustrates, generally at 10, a representative audio-broadcasting radio station which incorporates the system of the present invention, shown generally at 12. System 12 is employed by station 10 to deliver differently, from a broadcast source data flow represented by block 14, to two different kinds of audiences, including a streaming audience represented by block 16, and a broadcast audience represented by block 18. In the practice of the present invention, the full and unaltered broadcast data flow 14 is delivered seamlessly to the broadcast audience. This same data flow, however, is delivered only with respect to what are referred to herein as its content segments through system 12 to streaming audience 16. As has been mentioned above, system 12 functions in several important ways, through the practice of (a) content buffering and (b) alternative content injection, to deliver to streaming audience 16 what will be perceived by that audience to be a seamless delivery of information. In relation to this delivery, the streaming audience will receive the entirety of the principal content-segment material present in the broadcast data flow, interleaved with alternative injection content which, as will become more fully apparent shortly, will include alternative injection content material, where appropriate, along with any previously buffered content data derived from a data flow 14.

Accordingly, and in order to carry out the functionality of the invention, system 12 includes appropriately cooperatively connected blocks 20, 22, 24 which are disposed operatively, as illustrated, intermediate source data flow 14 and streaming audience 16.

To the extent that structures of blocks 20, 22, 24 incorporate and utilize hardware, firmware, software, etc., these "components" which make up the three blocks are individually entirely conventional in nature, may be organized to perform in accordance with practice of the present invention in a number of different ways within the skill levels of those generally skilled in the relevant art, and accordingly, are not detailed herein. Put another way, those skilled in the art, reading the schematic illustration of FIG. 1, along with the illustrative, schematic timing information still to be described with regard to FIG. 2, all in the context of both the general and the detailed descriptions of the invention herein, will readily be armed to construct and practice the system and methodology of the present invention.

The manners of cooperative operations which take place within the blocks representing system 12 in FIG. 1 will now become very fully apparent as descriptions thereof are now given, augmented with detailed timing information offered and discussed as illustrations in the pictured timing diagram of FIG. 2.

Descriptions which now follow regarding the systemic and methodologic behaviors of the invention will proceed on the assumption that radio station 10 has just begun to broadcast a data flow (source block 14) which includes alternating content and non-content segments as described earlier herein, and begins that broadcasting activity, for the purpose of what is illustrated in FIG. 2, with the broadcasting specifically of content-segment information. A further assumption is made that radio station 10, in the mode of operation now to be described, is configured to include, in every hour of broadcasting, two ad breaks including non-content segment material, each of which breaks has a pre-known time duration of 6.5-minutes. Yet another assumption which is made, for the purpose of describing the operation of the system and methodology of the invention as pictured in FIG. 2, is that block 22 in FIG. 1 represents a repository of available injection-content material, or materials, of different lengths, which lengths do not in any way match directly the 6.5-minute durations of the non-content segments that are broadcast every hour by radio station 10. These injection-content materials include various subject matters, including advertisement materials which are suitable for transmission to streaming audience 16, and songs.

One further note to be made with respect to the operation now about to be described respecting timing detail is that broadcast audience 18 is, and will be, completely unaware of the behavior of system 12 with regard to information that sent to streaming audience 16. Broadcast audience 18 will receive the full and unaltered broadcast data flow coming from source 14 in radio station 10.

The description which now follows of what is shown in FIG. 2 will make evident reference to various labeling and marking which is present in FIG. 2, and for this reason, additional reference numerals in the description of this invention are employed only sparsely in the content of FIG. 2.

As illustrated in FIG. 2, broadcasting begins with the simulcasting, in complete timing synchrony to both the streaming audience and the broadcast audience, at a point in time indicated at 26 in FIG. 2. The initially broadcast material is content-segment material which is properly streamable to streaming audience 16. This material is delivered to streaming audience 16 by system 12 effectively via system blocks 20, 24 which are appropriately "set up" within the system to permit the direct, in-time through-passage of this content information.

When the first 6.5-minute ad break come about, as is indicated by point 28 in FIG. 2, this event is monitored by block 20 which then produces an appropriate control/trigger signal to indicate definitively the presence of the beginning of this break. Such a signal immediately effects, in system 12, a dividing of the two audiences, as generally indicated at 30 in FIG. 2, a disconnection of any direct path between the streaming audience and source 14, and additionally, a delivery, through the system to the streaming audience, of alternative injection-content material from repository 22, thus to mask the forced absence (regarding the streaming audience) of the non-content segment (ad break) information contained in the source-14 data flow. The streaming audience will be completely unaware that there is any difference between what it is receiving and what audience 18 is receiving. The same will be true for broadcast audience 18 which will be totally unaware of the change which has just occurred for streaming audience 16.

As one progresses to the right in FIG. 2 from point 28, what is here illustrated, from the point of audience separation 30, is an upper line which now represents the information, and the timings therefor, being delivered to the broadcast audience, and a lower line which represents the same set of conditions for the divided streaming audience.

Thus, and as just described, at the onset of the first ad break marked at 28 in FIG. 2, the two audiences, 16, 18, become divided, and the streaming audience and the broadcast audience, in terms of what they are respectively receiving from station 10, are asynchronous with regard to one another.

Right after the audience division point marked in FIG. 2, the broadcast audience is hearing the ad-break content is referred to herein as non-content segment material, and the streaming audience is hearing alternative injection content supplied from depository 22. The transitions from content material reception to differentiation between what then follows differently to the two audiences, is completely seamless and natural.

In this audience-separation event which has just been described and illustrated, the reason that the streaming audience immediately begins to hear injection-content material delivered from repository 22 is that, in the illustration so far given, no content-segment material from source 14 has yet been buffered by buffer 24.

In the specific illustration now being given, we have made the assumption that the ad break is one which has an exact duration of 6.5-minutes. In this context, we will assume further that radio station 10 currently does not have an exactly matching 6.5-minutes in alternative injection content material, such as appropriately deliverable (i.e., permissibly streamable) ad material, and available song material, poised to send to the streaming audience. This turns out not to be any problem at all. For, as will be seen, the present invention handily, and elegantly, ignores this potentially troublesome "time mismatch" situation via implementing a unique, and highly and flexibly variable, time-shifting process which offers a remarkably acceptable solution—a solution which by-passes all concern regarding "precision time alignment".

Explaining the nature of this solution now, and presenting here one representative example, we will assume, realistically, that station 10 and system 12 are in fact currently "ready" selectively to deliver a certain, less-than-6.5-minute amount of alternative, streamable advertising material, and additionally, a small collection of songs, which can be presented as added together (i.e., linked in time) collectively to exceed the sum of 6.5-minutes (i.e., the length of the source ad-break time) in order successfully and seamlessly to bridge the gap between source content-material segments created by the source ad break.

Continuing, a very specific illustration here might be that station 10 has currently available two 0.5-minute alternative content ads which, utilizing system 12, it chooses to play out initially and successively during the source ad break period of time now when injection content is to be delivered to the streaming audience. Additionally, station 10 and system 12 also have readily available, and determine thereafter to make available for use, as needed to bridge the currently occurring 6.5-minute source ad break, songs from a collection of songs held in repository 22, such as an initially chooseable pair of songs including a first, 3.42-minute song, followed by a second, 3.12-minute song. These four, initially available, injection-content entities collectively add together to form a block of streaming injection material having a length of 7.54-minutes—an amount which is entirely adequate to bridge the time length of the current source ad break.

It is important to note, here, that system 12 does not need to know in advance the actual length of a non-content break in the source data flow, because of the fact that block 20 in the system carefully monitors such a break, noting both its beginning and its ending. If a particular piece of injection material happens to end before the monitored and noted end of the relevant triggering source ad break, system 20 simply continues to draw injection material as needed from repository 22. Preferably, although not necessarily, system 12 will know in advance the respective time lengths of each available piece of injection material. Any suitable and conventional system control technique may be employed to accomplish this. Alternatively, system 12 may be suitably constructed, in an otherwise conventional fashion, to note, on-the fly, the time ends of such materials.

When, in the illustration now being given, the end the of the first ad break from source 14 takes place, such end being marked at 32 in FIG. 2, the second one of the two particular songs mentioned above is still streaming to audience 16, and has 1-04-minutes to go before ending. Accordingly, system 12 at this point in time immediately begins using buffer 24 to collect and buffer the now-resuming flow of source-14 content-segment material. This overlap buffering activity is clearly indicated in FIG. 2.

After the elapse of the just mentioned 1.04-minutes, the streaming audience is effectively "ready" to be "rejoined" to the source broadcast flow, with such a rejoinder occurring operatively through buffer 24. Accordingly, continuous time-shift buffering, and resumed streaming delivery of source content-segment material, now take place, with content-segment material delivery to audience 16 beginning with the just previously buffered 1.04-minutes of "overlap" content material. Thus, and as is very clearly indicated by curved arrows that are presented in FIG. 2, the streaming audience now, after the end of the last of the two above-mentioned injection content songs, begins to receive a seamless-continuity reception of source content segment material.

When the next 6.5-minute non-content ad break occurs in source-14 material as indicated at 34 in FIG. 2, system 12 again employs a monitor/trigger signal, generated by block 20, to split the audience in preparation to initiate another bridging injection time period. This is clearly illustrated in FIG. 2. What will be observed here, confirmed by the time-calculation math associated with what is now occurring, is that the end of initial buffered play out of content material occurs with 5.4-minutes of the second source ad break still remaining to take place. This 5.4-minutes of time needs to be bridged.

Station 10 and system 12, for illustration purposes, now play out a single 0.5-minute alternative advertisement suitable for delivery to the streaming audience, followed by the successive playing out of two songs from repository 22. The first of these songs lasts for 2.25-minutes, and the second song lasts for 3.08-minutes.

With this injection behavior under way, and recognizing that the mentioned single alternative advertisement, and the two following injection songs, will be played out in their respective entireties so as to create a seamless experience for the streaming audience, an end-of-source-ad-break monitor/trigger signal, generated by system block 20, will occur at 36 in FIG. 2. This signal, of course, marks the end of the second 6.5-minute non-content add break coming from source 14. Such a signal, in the illustration now being given, will occur at point in time which is 2.44-minutes into the mentioned 3.08-minute injection song, and will mark the beginning of an "overlap" time period of 0.64-minutes. Accordingly, via the operation of block 20, system 12 again begins buffering the then-resumed content segment material coming from source 14.

Once comes the end of the second song that has just been delivered to the streaming audience in this second-described injection time period, the streaming audience will once again effectively be connected, and again through operation of buffer 24, to the broadcast source to receive a seamless continuation of the main content segment material, but now with a time delay therein of only 0.64-minutes.

Thus, the streaming audience under all circumstances, with the operation of system 12, will hear all of the principal content segment material coming from source 14, and will hear it in proper order, just as does the broadcast audience, but it will not hear any of the non-streamable, non-content advertisement material delivered by source 14.

Accordingly, a unique audience-splitting information-delivery system and methodology have now been illustrated and described. The system of the invention—its structure—is plainly set forth in FIG. 1. The methodology of the invention is illustrated in FIG. 2.

Broadly speaking, and from a structural point of view, the invention can be described as a system which is operatively interposable a data-flow source and a selected data-flow recipient group, operable, through establishing controlled connections and disconnections between such a source and the recipient group, to send to the group, over time, only the content-segment portions of a source data flow which is characterized by alternating, content and non-content segments, with the times of the non-sending of non-content-segment material being bridged by the alternative sending to the group, during and throughout a system-controlled injection time period, of at least selected injection-content material which differs from source-delivered non-content material.

The elements of this system include (a) a repository of injection-content material, (b) a data buffer operatively interposed the source and the recipient group, capable of buffering source content-segment material, and of later delivering such buffered material to the group, and possessing a continuous propensity to clear all buffered material, and (c) monitoring structure operatively connected to the source, to the repository, and to the buffer, operable to monitor the occurrences of non-content segment material coming from the source, and to produce, and to supply to the repository and to the buffer, in relation to such monitored occurrences, and for each such occurrence, control signaling which (1) effects/maintains, as appropriate, a direct disconnection between the source and the group, (2) the sending to the group, to fill an injection time period, of a linked combination of any source content-segment material then held by and deliverable from the buffer, followed by injection content material drawn from the repository, in a manner assuring the creation of an injection time period which extends at least to the conclusion of the most recent non-content segment occurrence, and (3) invokes buffering by the buffer of any source content-segment material delivered by the source during the period between the conclusion of the most recent non-content segment occurrence and the end of the current injection time period.

The methodology of the invention may be described broadly as being a method for sending, over time, to a first group of recipients only the content portions of a continuity source data-flow which takes the form of ordered, successive, alternating content and non-content segments, including the steps of (a) in a manner which utilizes content-segment-material buffering, delivering fully, and in correct order, to the first recipient group the material in each content segment, (b) bridging each gap between next-adjacent content segments at least partially with transmitted injection material differing from the non-content segment material in the gap, which injection material ends in time no sooner than the end of the gap, and (c) employing, as needed, and as a part of the mentioned full delivering, time-progressive, time-length-variable buffering, and subsequent, progressive buffer-delivering, of any content-segment material which overlaps in time with the transmission of injection material.

In conclusion, while preferred and best mode structural and methodologic aspects/features of the present invention have been illustrated and described herein, and certain variation possibilities suggested, we recognize that other variations and modifications may be appreciated by those generally skilled in the relevant art, and may be made without departing from the spirit of the invention. And, in this context, we intend that all such other modifications and variations be treated as being fully a part of the present invention.

We claim:

1. A method of operating a system including a processor and at least one non-transitory processor-readable storage medium communicatively coupled with the processor, the method comprising:
receiving a broadcast source data flow which is for broadcast to a broadcast audience of a plurality of broadcast receivers, and which comprises a plurality of content segments interspersed with a plurality of non-content segments, the content segments consisting of one or more sections of content material, and the non-content segments consisting of one or more sections of non-content material;
selecting a plurality of replacement sections of non-content material to replace one or more of the sections of non-content material of the non-content segments;
streaming as a stream the content segments of the broadcast and a plurality of replacement non-content segments interspersed with the content segments for an online audience of at least a plurality of streaming receivers;
when streaming the replacement non-content segments for the online audience, recognizing that a next one of the content segments is going to begin in the broadcast source data flow;
in response to recognizing that the next one of the content segments is going to begin, storing to a memory device any portions of the next one of the content segments of the broadcast source data flow which overlap with the replacement non-content segment still being streamed for the online audience;
for each of the replacement non-content segments streamed, detecting an end of the replacement non-content segment; and
in response to both recognizing that the next one of the content segments is going to begin in the broadcast source data flow and detecting the end of the replacement non-content segment, providing the stored portions of the content segments from the memory device for streaming to the streaming audience,
wherein a duration of the replacement sections of non-content material for each of the non-content segments at least equals a duration of the respective non-content segment as reduced by any portion of the stored content segment provided into the respective non-content segment, and the duration of the replacement sections of non-content material for at least one of the non-content segments is greater than the duration of the respective non-content segment as reduced by any portion of the stored content segment provided into the respective non-content segment, and
wherein selecting a plurality of replacement sections of non-content materials to replace one or more of the sections of the non-content materials of the non-content segments includes selecting at least one advertisement and at least one song which is not an advertisement as the replacement sections of non-content material to replace the sections of non-content material of one of the non-content segments.

2. The method of claim 1 wherein the providing the stored portions of the content segments from the memory device for the streaming to the streaming audience occurs while storing further portions of the content segments to the memory device.

3. The method of claim 1 wherein selecting a plurality of replacement sections of non-content materials to replace one or more of the sections of the non-content materials of the non-content segments includes selecting at least two advertisements to replace the sections of non-content material of one of the non-content segments.

4. The method of claim 1 wherein the streaming of the replacement non-content material is started without an exact knowledge of the duration of the respective non-content segment which the one or more replacement sections of non-content material is replacing.

5. The method of claim 1, further comprising:
terrestrially broadcasting the broadcast source data flow to the plurality of locally located broadcast receivers, and wherein the streaming includes streaming over at least one network to the plurality of streaming receivers at least some of which are remotely located.

6. The method of claim 1, further comprising:
detecting a respective one of the non-content segments in the broadcast source data flow; and
detecting an end of a respective one of the non-content segments of the broadcast source data flow, and wherein:
the providing the selected replacement sections of non-content material for respective non-content segments for the streaming to the streaming audience is in response to detecting the start of the non-content segments, and
the storing to the memory device any portions of the content segments of the broadcast source dataflow which overlap with the replacement non-content segment still being streamed is in response to detecting respective ones of the ends of the non-content segments.

7. A system, comprising:
a processor; and
at least one non-transitory processor-readable storage medium communicatively coupled with the processor which stores processor executable instructions that when executed by the at least one processor cause the one processor to:
receive a broadcast source data flow which is for broadcast to a broadcast audience of a plurality of broadcast receivers, and which comprises a plurality of content segments interspersed with a plurality of non-content segments, the content segments consisting of one or more sections of content material, and the non-content segments consisting of one or more sections of non-content material;
select a plurality of replacement sections of non-content material to replace one or more of the sections of non-content material of the non-content segments;
stream as a stream the content segments of the broadcast and a plurality of replacement non-content segments interspersed with the content segments for an online audience of at least a plurality of streaming receivers;
recognize that a next one of the content segments is going to begin in the broadcast source data flow while the replacement non-content segments are streamed for the online audience;
storing to a memory device any portions of the next one of the content segments of the broadcast source data flow which overlap with the replacement non-content segment still being streamed for the online audience in response to recognizing that the next one of the content segments is going to begin;
for each of the replacement content segments streamed, detect an end of the replacement content segment; and
in response to both recognizing that the next one of the content segments is going to begin in the broadcast source data flow and detecting the end of the replacement non-content segment, providing the stored portions of the content segments from the memory device for streaming to the streaming audience, wherein a duration of the replacement sections of non-content material for each of the non-content segments at least equals a duration of the respective non-content segment as reduced by any portion of the stored content segment provided into the respective non-content segment, and the duration of the replacement sections of non-content material for at least one of the non-content segments is greater than the duration of the respective non-content segment as reduced by any portion of the stored content segment provided into the respective non-content segment, and wherein selection of a plurality of replacement sections of non-content materials to replace one or more of the sections of the non-content materials of the non-content segments includes selection of at least one advertisement and at least one song which is not an advertisement as the replacement sections of non-content material to replace the sections of non-content material of one of the non-content segments.

8. The system of claim 7 wherein the provision of the stored portions of the content segments from the memory device for the streaming to the streaming audience occurs while storing further portions of the content segments to the memory device.

9. The system of claim 7 wherein selection of a plurality of replacement sections of non-content materials to replace one or more of the sections of the non-content materials of the non-content segments includes selection of at least two advertisements to replace the sections of non-content material of one of the non-content segments.

10. The system of claim 7 wherein the instructions cause the processor to start to stream the replacement non-content material without an exact knowledge of the duration of the respective non-content segment which the replacement sections of non-content material replaces.

11. The system of claim 7, further comprising:
a transmitter operable to terrestrially broadcast the broadcast source data flow to the plurality of locally located broadcast receivers, and wherein the streaming includes a transmission over at least one network to the plurality of streaming receivers at least some of which are remotely located.

12. The system of claim 7 wherein the instructions further cause the processor to:
detect a respective one of the non-content segments in the broadcast source data flow;
detect an end of a respective one of the non-content segments of the broadcast source data flow, and wherein:
the selected replacement sections of non-content material for respective non-content segments are provided for the streaming to the streaming audience in response to detection of the start of the non-content segments, and
any portions of the content segments of the broadcast source dataflow which overlap with the replacement non-content segment still being streamed are stored to the memory device in response to detection of respective ones of the ends of the non-content segments.

13. A non-transitory computer-readable medium that stores processor executable instructions which when executed by a processor causes the processor to operate a system, by:
receiving a broadcast source data flow which is for broadcast to a broadcast audience of a plurality of broadcast receivers, and which comprises a plurality of content segments interspersed with a plurality of non-content segments, the content segments consisting of one or more sections of content material, and the non-content segments consisting of one or more sections of non-content material;
selecting a plurality of replacement sections of non-content material to replace one or more of the sections of non-content material of the non-content segments;
streaming as a stream the content segments of the broadcast and a plurality of replacement non-content segments interspersed with the content segments for an online audience of at least a plurality of streaming receivers;
when streaming the replacement non-content segments for the online audience, recognizing that a next one of the content segments is going to begin in the broadcast source data flow;
in response to recognizing that the next one of the content segments is going to begin, storing to a memory device any portions of the next one of the content segments of the broadcast source data flow which overlap with the replacement non-content segment still being streamed for the online audience;
for each of the replacement non-content segments streamed, detecting an end of the replacement non-content segment; and
in response to both recognizing that the next one of the content segments is going to begin in the broadcast source data flow and detecting the end of the replacement non-content segment, providing the stored portions of the content segments from the memory device for streaming to the streaming audience, and
wherein a duration of the replacement sections of non-content material for each of the non-content segments at least equals a duration of the respective non-content segment as reduced by any portion of the stored content segment provided into the respective non-content segment, and the duration of the replacement sections of non-content material for at least one of the non-content segments is greater than the duration of the respective non-content segment as reduced by any portion of the stored content segment provided into the respective non-content segment, and
wherein selecting a plurality of replacement sections of non-content materials to replace one or more of the sections of the non-content materials of the non-content segments includes selecting at least one advertisement and at least one song which is not an advertisement as the replacement sections of non-content material to replace the sections of non-content material of one of the non-content segments.

14. The nontransitory computer-readable medium of claim 13 wherein the providing the stored portions of the content segments from the memory device for the streaming to the streaming audience occurs while storing further portions of the content segments to the memory device.

15. The nontransitory computer-readable medium of claim 13 wherein selecting a plurality of replacement sections of non-content materials to replace one or more of the sections of the non-content materials of the non-content segments includes selecting at least two advertisements to replace the sections of non-content material of one of the non-content segments.

16. The nontransitory computer-readable medium of claim 13 wherein the streaming of the replacement non-content material is started without an exact knowledge of the duration of the respective non-content segment which the one or more replacement sections of non-content material is replacing.

17. The nontransitory computer-readable medium of claim 13 wherein the instruction cause the processor to operate the system, further by:
  terrestrially broadcasting the broadcast source data flow to the plurality of locally located broadcast receivers, and wherein the streaming includes streaming over at least one network to the plurality of streaming receivers at least some of which are remotely located.

18. The nontransitory computer-readable medium of claim 13 wherein the instruction cause the processor to operate the system, further by:
  detecting a start of a respective one of the non-content segments in the broadcast source data flow; and
  detecting an end of a respective one of the non-content segments of the broadcast source data flow, and wherein:
  the providing the selected replacement sections of non-content material for respective non-content segments for the streaming to the streaming audience is in response to detecting the start of the non-content segments, and
  the storing to the memory device any portions of the content segments of the broadcast source dataflow which overlap with the replacement non-content segment still being streamed is in response to detecting respective ones of the ends of the non-content segments.

\* \* \* \* \*

UNITED STATES PATENT AND TRADEMARK OFFICE
CERTIFICATE OF CORRECTION

PATENT NO.         : 8,381,244 B2
APPLICATION NO.    : 11/985143
DATED              : February 19, 2013
INVENTOR(S)        : Michael J. King et al.

It is certified that error appears in the above-identified patent and that said Letters Patent is hereby corrected as shown below:

In the Claims

Column 10, Line 15:
"detecting a respective one of the non-content segments in" should read, --detecting a start of a respective one of the non-content segments in--.

Column 11, Line 12:
"detect a respective one of the non-content segments in the" should read, --detect a start of a receptive one of the non-content segments in the--.

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,381,244 B2 | Page 1 of 1 |
| APPLICATION NO. | : 11/985143 | |
| DATED | : February 19, 2013 | |
| INVENTOR(S) | : Michael J. King et al. | |

It is certified that error appears in the above-identified patent and that said Letters Patent is hereby corrected as shown below:

In the Claims

Column 10, Line 15:
"detecting a respective one of the non-content segments in" should read, --detecting a start of a respective one of the non-content segments in--.

Column 11, Line 45:
"detect a respective one of the non-content segments in the" should read, --detect a start of a receptive one of the non-content segments in the--.

This certificate supersedes the Certificate of Correction issued October 15, 2013.

Signed and Sealed this
Eighteenth Day of February, 2014

Michelle K. Lee
*Deputy Director of the United States Patent and Trademark Office*